United States Patent [19]

Brewster

[11] Patent Number: 4,547,970

[45] Date of Patent: Oct. 22, 1985

[54] THREAD ANVILS FOR INSIDE MICROMETER

[76] Inventor: Albert L. Brewster, R.R. 2, Box 190A, Pleasant Hill, Mo. 64080

[21] Appl. No.: 637,309

[22] Filed: Aug. 3, 1984

[51] Int. Cl.⁴ .......................... G01B 3/18; G01B 5/12
[52] U.S. Cl. .................................. 33/167; 33/199 R
[58] Field of Search .......... 33/143 G, 147 K, 147 M, 33/164 C, 167, 199 R

[56] References Cited

U.S. PATENT DOCUMENTS

| 1,797,122 | 3/1931 | Bohn | 33/167 |
| 2,249,611 | 7/1941 | Johnson | 33/199 R |
| 2,410,571 | 11/1946 | Easton et al. | 33/167 |
| 2,556,580 | 6/1951 | Fox et al. | 33/199 R |
| 2,937,452 | 5/1960 | Man | 33/167 |
| 3,111,766 | 11/1963 | Bryant | 33/167 |
| 4,453,316 | 6/1984 | Marveggio | 33/147 M |

OTHER PUBLICATIONS

Rowell, "Using a Ball-Pointed Mike for Internal Thread Measurement", *American Machinist*, Jul. 1931, p. 179.

*Primary Examiner*—Richard R. Stearns
*Attorney, Agent, or Firm*—Kokjer, Kircher, Bradley, Wharton, Bowman & Johnson

[57] ABSTRACT

A thread gauge which attaches to an inside micrometer to measure the thread pitch diameter of internally threaded parts. A pair of anvils have external threads which match in pitch with the threads of the part. Each anvil has a bore which receives a ball and a slot which receives a stem projecting from the ball. Mounting sleeves connect the stems with the opposite ends of the micrometer. Each anvil can rotate on its ball about the stem axis so that the micrometer can be adjusted to position the anvils against the threaded part. The anvils can also move linearly on the balls to properly align with the threads of the part.

20 Claims, 3 Drawing Figures

THREAD ANVILS FOR INSIDE MICROMETER

BACKGROUND AND SUMMARY OF THE INVENTION

This invention relates generally to the measurement of thread pitch diameters and more particularly to a gauge assembly for attachment to an inside micrometer to provide for the accurate measurement of the pitch diameter of an internally threaded part.

When threaded parts are manufactured, it is necessary to accurately measure the pitch diameter of the threads in order to assure that the part has the necessary thread dimensions. Similarly, finished parts must be measured during inspection operations to check the pitch diameter.

The Government has rights in this invention pursuant to Contract No. DE-AC04-76DP00613 awarded by the U.S. Department of Energy.

In my co-pending application Ser. No. 568,837, filed on Jan. 6, 1984, I disclose a thread gauge which can be used to measure the pitch diameter of both external and internal threads. However, the depth to which the gauge can be extended into an internally threaded part is limited by the length of the blades of the caliper instrument to which the gauge is attached. Therefore, even though this device is entirely satisfactory for gauging inside threads on a fairly shallow lip of a part, it is not applicable in situations where the internal threads are located on a recessed area of the part or where the threads are located too deeply in the part to accommodate the caliper blades.

At present, parts which are internally threaded can be measured only with a thread plug gauge which is a go-no go device. The thread plug gauges have standard sizes and are thus able to measure only standard pitch diameters. The thread plug gauge is particularly unsatisfactory if a large number of nonstandard threads are manufactured. In any case, the cost of maintaining a large number of different size plug gauges is often prohibitive, since each gauge is useful only for a single size and is lacking both in versatility and adjustability.

Consequently, it is evident that a need exists for a thread gauge for accurately measuring the thread pitch diameter of internally threaded parts. It is the primary goal of the present invention to meet this need.

More specifically, it is an object of the invention to provide a thread gauge which functions to accurately measure the thread pitch diameter of internally threaded parts having virtually any size and shape. In this respect, it is noteworthy that the thread gauge of the present invention can be applied to any part which can accommodate an inside micrometer, regardless of the location of the threads on the part.

In accordance with the invention, I provide thread anvils having external threads which match the pitch of the internal threads that are to be measured. Each anvil is provided with a bore and a slot which intersects with the bore. Each anvil has a spherical tooling ball which fits closely in its bore. A stem projects from each ball and extends through the slot in the anvil. This arrangement allows each anvil to rotate on its ball so that the micrometer shaft can be turned while the threads on the anvils remain properly oriented to mate with the internal threads of the part which is undergoing measurement. At the same time, the slots permit the anvils to move linearly back and forth on the balls so that the anvil threads can properly align with the threads of the part.

The anvils can be attached to the opposite ends of virtually any inside micrometer from the smallest size to the largest size. A mounting sleeve is fitted on each stem and secured thereto by a set screw. A second set screw is used to lock each sleeve on the micrometer with each stem positioned end to end against the micrometer end. In this manner, the anvils are precisely located on the opposite ends of the micrometer so that the known dimensions of the gauge can be added to the scale reading to thereby provide an accurate measurement of the pitch diameter of the internally threaded part.

DETAILED DESCRIPTION OF THE INVENTION

In the accompany drawing which forms a part of the specification and is to be read in conjunction therewith and in which like reference numerals are used to indicate like parts in the various views.

Figure 1:
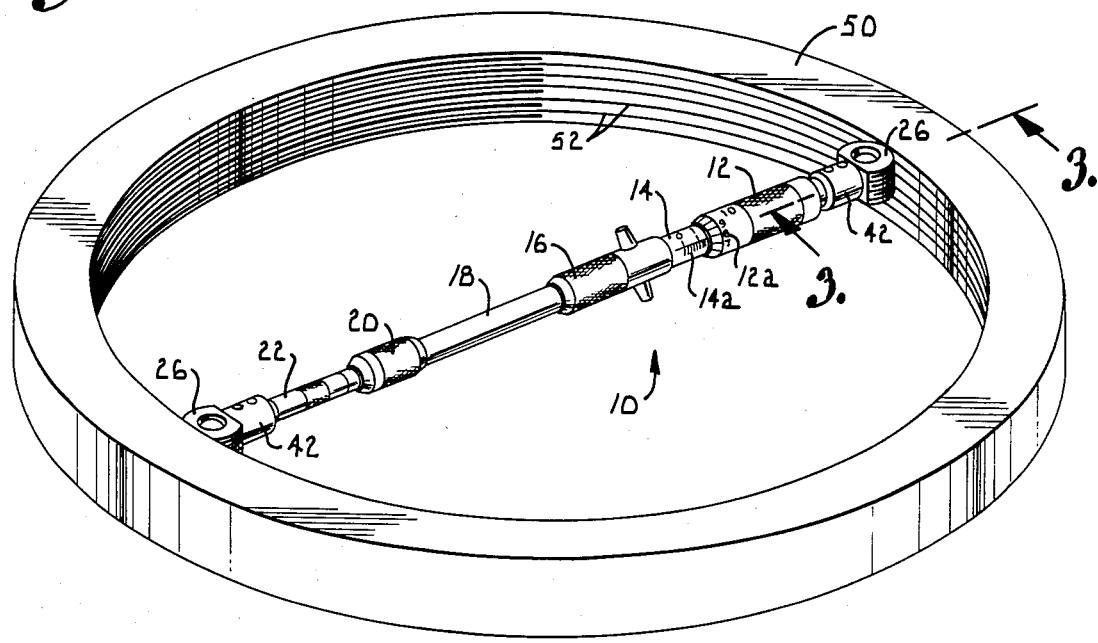
FIG. 1 is a perspective view showing an inside micrometer equipped with a thread gauge arrangement constructed according to a preferred embodiment of the present invention, with the thread anvils of the gauge applied to an internally threaded part to measure the thread pitch diameter.
Figure 2:
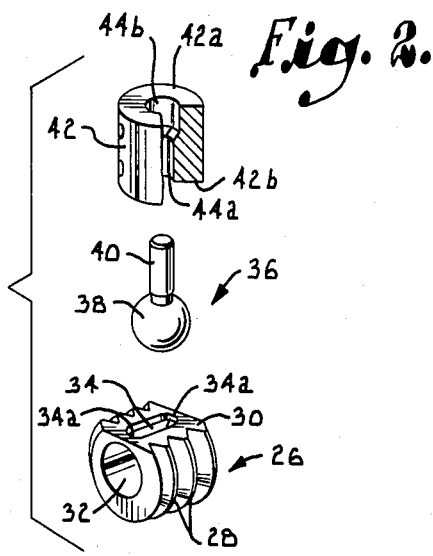
FIG. 2 is an exploded perspective view showing the components of each thread gauge assembly, with a portion of the mounting sleeve broken away for purposes of illustration.

Referring now to the drawing in more detail and initially to FIG. 1, the present invention provides a thread gauge which is used with a conventional inside micrometer generally designated by numeral 10. The micrometer 10 includes a thimble 12 having a thimble scale 12a thereon adjacent to a sleeve 14 having a vernier scale 14a. The thimble 12 is rotatable on sleeve 14 and extends and retracts when rotated to change the overall length of the micrometer 10. The scales 12a and 14a cooperate to provide a scale reading indicative of the overall length of the micrometer and thus the dimension of the part that is being measured. The end of sleeve 14 opposite the thimble 12 connects with a barrel 16. Another sleeve 18 extends from barrel 16 to another barrel 20. A rod 22 extends from barrel 20 and has a free end which forms one end of the micrometer 10. The opposite end of the micrometer is formed by another short rod 24 (see FIG. 3.).

In accordance with the present invention, a thread gauge can be attached to the inside micrometer 10 to measure the thread pitch diameters of internally threaded parts. The thread gauge includes a pair of metal anvils 26 which are identical to one another and mounted on the opposite ends of the micrometer 10. Each anvil 26 has a cylindrical outside surface which is provided with spiral threads 28. The pitch of threads 28 is the same as the pitch of the threads on the internally threaded part which is to be measured. Therefore, it is contemplated that a number of different sets of anvils will be provided, with each set having threads with a different pitch so that parts with different thread pitches can be measured.

The outside of each anvil 26 is machined to provide a flat surface 30 which is unthreaded. A cylindrical bore 32 is formed through each anvil 26 from end to end and is coaxial with the cylindrical exterior surface of the anvil. An elongated slot 34 extends into the flat surface 30 of each anvil and intersects with the bore 32. The length dimension of each slot 34 is oriented parallel to the axis of the bore 32. The slots 34 do not extend the entire length of the anvils 26 but instead terminate in opposite ends 34a.

Each anvil 26 is provided with a tooling ball 36. Each tooling ball 36 includes a spherical ball 38 and a cylindrical stem 40 which projects from the ball 38. The balls 38 are substantially equal in diameter to the diameter of the anvil bores 32. Each stem 40 is substantially equal in diameter to the width of the slot 34. Consequently, the stem 40 can be extended into bore 32 and through slot 34 in order to position the ball 38 in bore 32 with the stem projecting out of the anvil through the slot 34. The balls 38 fit closely in bores 32 but permit the anvils to rotate on the balls. The stems 40 similarly have a close fit in slots 34 but permit the anvils to slide linearly on balls 38 between limiting positions defined when the stem 40 reaches the opposite ends 34a of the slot. Preferably, the balls 38 and anvils 26 are formed from hardened tool steel to prevent them from wearing unduly.

A mounting sleeve 42 is used to attach each anvil 26 and tooling bar 36 to the micrometer 10. Each sleeve 42 is cylindrical and is provided with the central bore which includes a first bore portion 44a and a somewhat larger bore portion 44b which forms a continuation of bore portion 44a. Bore portion 44a is substantially equal in diameter to stem 40, while the other bore portion 44b is substantially equal in diameter to the rods 22 and 24 which form the opposite ends of the micrometer. A set screw 46 is threaded into a passage which intersects with bore portion 44a. Another set screw 48 is threaded into another passage which intersects with bore portion 44b. Each mounting sleeve 42 has flat, annular opposite ends 42a and 42b.

In use, the thread gauge of the present invention cooperates with the inside micrometer 10 to measure the thread pitch diameters of internally threaded parts such as the internally threaded ring 50. Spiral threads 52 are formed internally on ring 50. The anvil threads 28 have the same pitch as the internal threads 52 on the ring.

Figure 3:
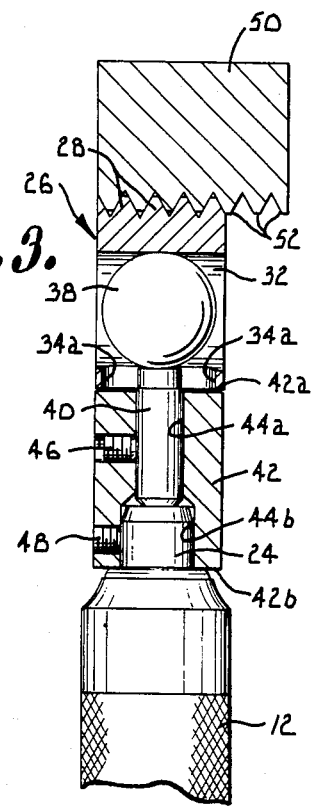
FIG. 3 is a fragmentary sectional view on an enlarged scale taken generally along line 3—3 of FIG. 1 in the direction of the arrows.

The thread gauge is used by first applying the tooling balls 26 in the manner indicated previously. This results in the balls 38 being received in the anvil bores 32 with the stems 40 extending through slots 34. The mounting sleeves 42 are applied to the rods 22 and 24 which form the opposite ends of the micrometer. As shown in FIG. 3, sleeve 42 is applied to rod 24 until the sleeve end 42b contacts the end of the thimble 12. Then, set screw 48 is tightened to secure the mounting sleeve on one end of the micrometer. The other mounting sleeve 42 is similarly attached to the opposite end of the micrometer.

Next, the stems 40 are applied to the mounting collars 42 such that the stems extend through bore portions 44a into contact with the ends of the micrometer. This position is shown in FIG. 3, and it is noted that stem 40 is located end to end with rod 24. Set screw 46 is then tightened against stem 40 to thereby secure anvil 26 on the end of the micrometer. The length of each mounting sleeve 42 is such that the flat surface 30 of anvil 26 is spaced slightly from end 42a of the mounting sleeve to present a small gap between the anvil and sleeve. This gap is large enough to permit each anvil 26 to freely rotate and move linearly without interference, and it is small enough to maintain the stability of anvils 26 on the ball elements 38.

After the anvils have been applied in this manner to the opposite ends of the micrometer 10, measurements can be taken of the pitch diameter of an internal threaded part. The micrometer 10 is inserted into the ring 50 and adjusted until the two anvils 26 are brought against the internal threads 52 at diametrically opposed locations on the ring 50. Since the anvil threads 28 have the same pitch as the ring threads 52, the anvil threads exactly mate with the threads on the ring, as shown in FIG. 3. The threads 28 fit closely in the grooves between threads 52, and threads 52 similarly fit closely in the grooves presented between the anvil threads 28.

In order to apply the anvils to the internally threaded part, it is necessary to turn the thimble 12. Since the anvils 26 are able to turn on balls 38, this can be accomplished while the anvils are maintained in the proper orientations to mate with the threads 52 on ring 50. At the same time, each anvil 26 is able to slide linearly on its ball 38 in the direction of bore 32 or perpendicular to stem 30. This linear movement permits the anvils to shift so that their threads can properly align with threads 52. The opposite ends 34a of slots 34 retain the anvils on the tooling balls and limit the extent to which the anvils can slide linearly. The slots are long enough to permit the anvil threads to align with the threads of the internally threaded part that is being measured. It is noted that end surface 42a of each mounting sleeve 42 confronts the adjacent flat surface 30 of the anvil 26. The interaction between these two surfaces restricts anvils 26 to rotation on balls 38 about an axis which is coincident with the axis of stem 40. Thus, the confronting surfaces of the anvils and sleeves maintain the stability of the anvils without restricting their freedom of movement as necessary to properly engage with threads 52.

When micrometer 10 has been extended sufficiently to properly apply the anvils 26 to the internal threads 52, the pitch diameter of the part that is undergoing measurement is equal to the measurement indicated on the scales 12a and 14a, plus a number equal to the pitch diameter of the anvil threads 28 plus the diameter of ball 38 plus twice the length of the stem 40. Since the length of the stem 40, the diameter of ball 38 and the pitch diameter of threads 28 are all known, the number which must be added to the scale reading is known and is the same for all parts that are undergoing measurement. Consequently, the measurement can be easily carried out in all cases by adding a known number to the measurement reading on the micrometer 10.

The thread gauge can be removed from the micrometer 10 simply by loosening set screws 48 and detaching the mounting sleeves 48 from the opposite ends of the micrometer. The micrometer can then be used in its intended fashion for other measurements, or anvils having different pitch diameters can be applied to it for use in measuring internally threaded parts having different thread pitches. Set screw 46 can be loosened to detach the mounting sleeve 42 from the tooling ball 36, and the tooling ball can be separated from anvil 26 if desired. If the anvils in each different anvil set have bores 32 and slots 34 of the same size, the same tooling balls 36 and attachment collars 42 can be used to attach each set of anvils to the micrometer 10.

The thread gauge of the present invention can be used to measure inside pitch diameters on parts having virtually any size and configuration. So long as the inside micrometer can be applied inside of the part and the length of each anvil assembly can be accomodated, a measurement can be taken. The micrometer with the thread gauge attached can be inserted to virtually any depth. At the same time, micrometers having virtually any length can be used. For example, micrometers as short as one and one half inches can be used, as can micrometers as long as 40 inches and more. The only requirement is that the anvils have threads with the same pitch as the threads of the part that is undergoing measurement.

The mounting arrangement for the anvils locates stems 40 end to end with the micrometer and thereby precisely locates each anvil 26 at a predetermined location with respect to the micrometer end. This assures that each measurement will be accurate. Since the parts are preferably made of hardened tool steel, wear is minimized and the accuracy is maintained even after the thread gauge has been used extensively. The thread gauge can measure the pitch diameter of virtually any type of thread, including Acme threads, buttress threads and both English and metric threads.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A thread gauge for application to opposite ends of an inside micrometer to measure the thread pitch diameter of an internally threaded part, said thread gauge comprising:
    a pair of anvils each presenting external threads having substantially the same pitch as the threads of the internally threaded part;
    a tooling ball for each anvil, each tooling ball including a ball element and a stem extending from the ball element;
    means for mounting each anvil on the corresponding tooling ball in a manner permitting the anvil to rotate on the ball element and move linearly on the ball element in a direction generally perpendicular to the stem; and
    means for connecting said stems to the opposite ends of the micrometer to mount each anvil thereon at a predetermined location relative to the corresponding end of the micrometer, whereby the micrometer can be adjusted to position the threads of the anvils against the threads of the internally threaded part at diametrically opposed locations thereon to provide a measurement of the pitch diameter of the internally threaded part.

2. The invention of claim 1, wherein said mounting means includes:
    a bore in each anvil closely receiving the ball element of the corresponding tolling ball, said anvils being rotatable on the ball elements and being movable linearly thereon in the direction of the axes of the bores; and
    a slot in each anvil through which the stem of the corresponding tooling ball extends, each slot having a length dimension oriented parallel to the axis of the bore and a lesser width dimension substantially equal to the diameter of the stem to permit the anvils to move linearly on the ball element between limiting positions defined when the stem reaches opposite end of the slot.

3. The invention of claim 2, wherein each anvil has an exterior configuration to present a generally cylindrical surface on which said external threads are formed in a spiral arrangement and a substantially flat surface into which the slot extends, each bore being coaxial with the cylindrical surface of the anvil.

4. The invention of claim 3, wherein said connecting means includes:
    a mounting sleeve for each stem having a first bore portion for closely receiving the stem and a second bore portion for closely receiving one end of the micrometer;
    means for securing each sleeve to the corresponding stem with the stem extending into said first bore portion of the sleeve; and
    means for detachably connecting said sleeves to the opposite ends of the micrometer with the micrometer ends extending into said second bore portions in end to end relation with said stems.

5. The invention of claim 4, wherein each stem has a length to space said anvils away from said sleeves when the stems are end to end with the ends of the micrometer.

6. The invention of claim 4, including an end surface on each sleeve located adjacent said flat surface of the corresponding anvil to restrict each anvil to rotation on said ball element about an axis coincident with the axis of the corresponding stem.

7. The invention of claim 1, wherein said connecting means includes:
    a mounting sleeve for each stem having a first bore portion for closely receiving the stem and a second bore portion for closely receiving one end of the micrometer;
    means for securing each sleeve to the corresponding stem with the stem extending into said first bore portion of the sleeve; and
    means for detachably connecting said sleeves to the opposite ends of the micrometer with the micrometer ends extending into said second bore portions in end to end relation with said stems.

8. The invention of claim 7, including flat surfaces on each anvil and sleeve confronting one another to limit each anvil to rotation on its ball element about an axis coincident with the axis of the corresponding stem.

9. The invention of claim 7, wherein said securing means includes a set screw threaded into each sleeve and engaging the corresponding stem to secure the sleeve on the stem.

10. The invention of claim 7, wherein said detachable connecting means includes a set screw threaded into each sleeve and engageable with one end of the micrometer to secure the sleeve on the micrometer end.

11. In combination with an inside micrometer having opposite ends, a thread gauge arrangement for measuring the thread pitch diameter of an internally threaded part, comprising:

a pair of anvils each having a generally cylindrical exterior surface provided with spiral threads having the same pitch as the threads of the threaded part, said anvils being applicable to the threaded parts at diametrically opposed locations thereon with the threads of the anvils mating with the threads of the threaded part;

a bore extending in each anvil axially therein;

a slot in each anvil connecting with the bore thereof;

a ball element received closely in the bore of each anvil, said anvils being rotatable on the ball elements and being movable linearly thereon;

a stem extending from each ball element through the slot of the corresponding anvil, said anvils being movable linearly relative to said stems with said slots limiting the linear movement of the anvils and maintaining the anvils on the ball elements; and means for detachably connecting said stems to the respective opposite ends of the micrometer to mount said anvils thereon at predetermined locations, whereby the micrometer can be adjusted to engage the anvils against the internally threaded part with said slots accommodating linear movement of the anvils on the ball elements to permit the threads of the anvils to mate with the threads of the internally threaded part.

12. The invention of claim 11, wherein each slot has opposite ends against which the stem is engageable to define limiting positions for the linear movement of each anvil on the ball element.

13. The invention of claim 11, wherein:
each stem has a free end; and
said detachable connecting means is operable to connect said stems in end to end contact with the opposite ends of the micrometer.

14. The invention of claim 13, wherein said detachable connecting means includes:
a mounting sleeve for each stem having a first bore portion for closely receiving the stem and a second bore portion for closely receiving one end of the micrometer;
means for securing each sleeve to the corresponding stem with the stem extending into said first bore portion of the sleeve; and
means for detachably connecting said sleeves to the opposite ends of the micrometer with the micrometer ends extending into said second bore portions in end to end relation with said stems.

15. The invention of claim 14, including confronting surfaces on said sleeves and anvils cooperating to limit each anvil to rotation on its ball element about an axis coincident with the axis of the corresponding stem.

16. A thread gauge for use with an inside micrometer having opposite ends to measure the thread pitch diameter of an internally threaded part, said thread gauge comprising:

a pair of anvils each having an exterior configuration presenting a generally cylindrical surface provided with spiral threads and a substantially flat surface, said threads having the same pitch diameter as the threads of the internally threaded part;

a cylindrical bore extending through each anvil, said bores being coaxial with said cylindrical surfaces;

a slot in each anvil extending into the flat surface thereof and connecting with said bore, each slot having a length dimension oriented parallel to the axis of the bore and a width dimension transverse to the length dimension;

a ball element fitting closely in the bore of each anvil with the anvils being rotatable on the ball elements and movable linearly thereon in the direction of the bore axis;

a stem extending from each ball element through the slot of the corresponding anvil, each stem having a free end projecting beyond the flat surface of the anvil and each stem having a diameter to fit closely through the slot to permit the anvils to move linearly on the ball elements with limiting positions defined when the stems reach opposite ends of the slots;

a mounting sleeve for each anvil, each sleeve having a first bore portion for closely receiving the corresponding stem and a second bore portion for closely receiving one end of the micrometer;

means for securing said sleeves to said stems with the stems extending into said first bore portions; and detachable means for connecting said sleeves to the opposite ends of the micrometer with the micrometer ends extending into said second bore portions in end to end relation with said stems, thereby mounting said anvils at predetermined locations on the opposite ends of the micrometer to permit the micrometer to be adjusted to position the anvils against the internally threaded part at diametrically opposed locations thereon for measurement of the pitch diameter of the part.

17. The invention of claim 16, including an end surface of each sleeve confronting said flat surface of the corresponding anvil to restrict each anvil to rotation on its ball element about an axis coincident with the axis of the corresponding stem.

18. The invention of claim 17, wherein the end surface of each sleeve is spaced from the flat surface of the corresponding anvil.

19. The invention of claim 16, wherein said securing means includes a set screw threaded into each sleeve and engageable with the corresponding stem.

20. The invention of claim 16, wherein said detachable means includes a set screw threaded into each sleeve and engageable with one end of the micrometer to connect the sleeve thereto.

* * * * *